US008918414B2

(12) United States Patent
Takami

(10) Patent No.: US 8,918,414 B2
(45) Date of Patent: Dec. 23, 2014

(54) INFORMATION PROVIDING DEVICE, INFORMATION PROVIDING METHOD, INFORMATION PROVIDING PROCESSING PROGRAM, AND RECORDING MEDIUM HAVING INFORMATION PROVIDING PROCESSING PROGRAM RECORDED THEREON

(75) Inventor: Shinya Takami, Tokyo (JP)

(73) Assignee: Rakuten, Inc., Tokyo (JP)

( * ) Notice: Subject to any disclaimer, the term of this patent is extended or adjusted under 35 U.S.C. 154(b) by 7 days.

(21) Appl. No.: 13/643,714

(22) PCT Filed: Apr. 28, 2011

(86) PCT No.: PCT/JP2011/060395
§ 371 (c)(1),
(2), (4) Date: Oct. 26, 2012

(87) PCT Pub. No.: WO2011/136341
PCT Pub. Date: Nov. 3, 2011

(65) Prior Publication Data
US 2013/0054629 A1    Feb. 28, 2013

(30) Foreign Application Priority Data
Apr. 28, 2010 (JP) ................................. 2010-104278

(51) Int. Cl.
*G06F 17/00* (2006.01)
*G06F 17/30* (2006.01)
(52) U.S. Cl.
CPC .... *G06F 17/30265* (2013.01); *G06F 17/30277* (2013.01)
USPC ............. 707/763; 707/722; 707/758; 706/12; 706/14

(58) Field of Classification Search
None
See application file for complete search history.

(56) References Cited

U.S. PATENT DOCUMENTS

| 5,579,471 | A * | 11/1996 | Barber et al. ................. 715/700 |
| 7,389,181 | B2 * | 6/2008 | Meadow et al. ............. 701/522 |
| 7,882,112 | B2 * | 2/2011 | Takata et al. .................. 707/749 |
| 8,412,705 | B2 * | 4/2013 | Kaburagi et al. ............. 707/728 |
| 8,744,173 | B2 * | 6/2014 | Vincent et al. ................ 382/159 |
| 2007/0203942 | A1 * | 8/2007 | Hua et al. .................... 707/104.1 |
| 2008/0147676 | A1 * | 6/2008 | You ................................ 707/10 |
| 2008/0240572 | A1 * | 10/2008 | Hoshii ......................... 382/190 |
| 2008/0317353 | A1 * | 12/2008 | Chien ........................... 382/195 |

(Continued)

FOREIGN PATENT DOCUMENTS

| JP | 2002-373168 A | 12/2002 |
| JP | 2007-96379 A | 4/2007 |
| JP | 2008-269557 A | 11/2008 |
| JP | 2009-193187 A | 8/2009 |

OTHER PUBLICATIONS

Extended European Search Report dated Sep. 2, 2013, issued in European Patent Application 11775122.2.

(Continued)

*Primary Examiner* — Hung Le
(74) *Attorney, Agent, or Firm* — Sughrue Mion, PLLC

(57) ABSTRACT

There are provided an information providing device, an information providing processing program, and an information providing method which can efficiently recommend information related to a shooting spot matching a user's preference. The information providing device is configured to search for image data based on object information specified by a user with respect to a frame, and an arrangement of the object information.

15 Claims, 5 Drawing Sheets

(56) References Cited

U.S. PATENT DOCUMENTS

| | | |
|---|---|---|
| 2009/0202147 A1 | 8/2009 | Sambongi |
| 2010/0070523 A1* | 3/2010 | Delgo et al. .................. 707/769 |
| 2011/0225153 A1* | 9/2011 | Haseyama .................... 707/736 |

OTHER PUBLICATIONS

Japanese Office Action dated Dec. 4, 2012 issued in Japanese Application No. 2012-512911.

* cited by examiner

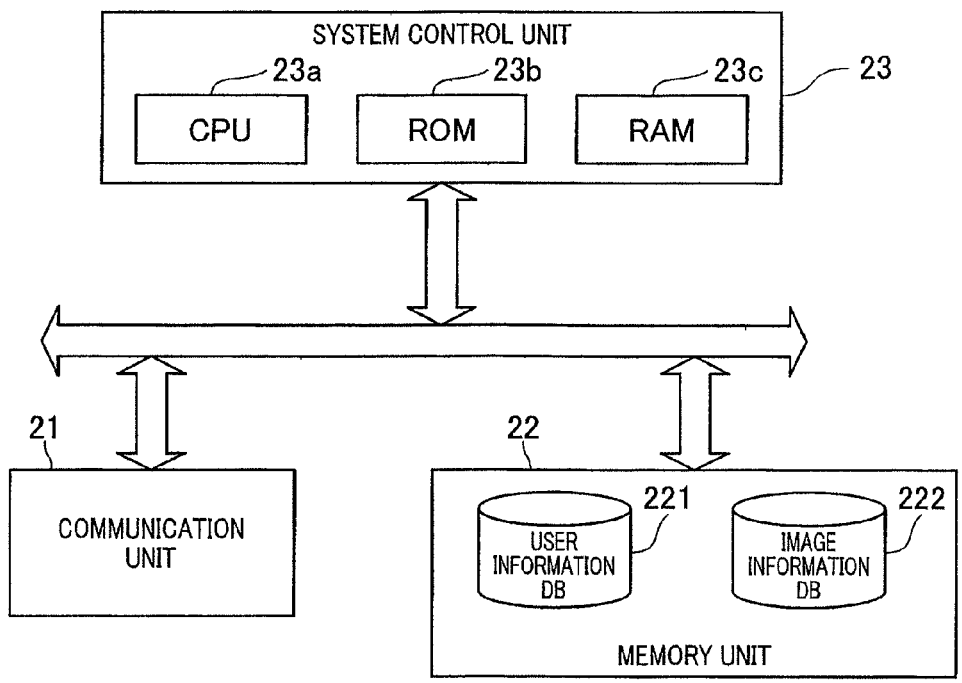

INFORMATION PROVIDING DEVICE, INFORMATION PROVIDING METHOD, INFORMATION PROVIDING PROCESSING PROGRAM, AND RECORDING MEDIUM HAVING INFORMATION PROVIDING PROCESSING PROGRAM RECORDED THEREON

CROSS REFERENCE TO RELATED APPLICATIONS

This application is a National Stage of International Application No. PCT/JP2011/060395, filed on Apr. 28, 2011, and claims priority based on Japanese Patent Application No. 2010-104278, Apr. 28, 2010, the contents of all of which are incorporated herein by reference in their entirety.

TECHNICAL FIELD

The present invention relates to a technical field such as an information providing device which can recommend information which is useful for shooting spots matching users' preferences, to users through a network.

BACKGROUND ART

Conventionally, a search service is known which searches for related information using information related to a shooting target (such as a sunrise, high-altitude plants and autumnal leaves) as a key. Such a search service provides information matching a search keyword, to a user terminal which connects to the search service through Internet, and can search for information to which related information such as a comment is added to an image captured when a shooting spot needs to be searched for. Patent Literature 1 discloses a technique of generating an original image to which position information is attached by setting longitude/latitude information to an extended tag portion of an Exif format, releasing the generated image on a web page, and providing information related to a shooting spot close to an arbitrary location, in response to information search using arbitrary location information such as a current position of a user as a key.

CITATION LIST

Patent Literature

Patent Literature 1: Japanese Patent Application Laid-Open No. 2002-373168

SUMMARY OF THE INVENTION

Problem to be Solved by the Invention

However, according to the above conventional technique, a user who searches for a shooting spot needs to set a search keyword which is adequate for the shooting spot, and it is complicated for the user to set the keyword. Further, Patent Literature 1 discloses providing information related to a shooting spot close to an arbitrary location which the user sets based on longitude/latitude information included in image information, and it is difficult to efficiently recommend information related to a shooting spot matching a user's preference based on object information (for example, a landscape such as a mountain or a sea, or people such as a family or children) included in a captured image. Furthermore, when, for example, a user wants to obtain a desired image without going to a shooting spot, the conventional technique has difficulty in efficiently searching for and recommending an image including object information (object information matching a user's preference) which the user have an image of.

The present invention is made in light of the above, and an object of the present invention is to provide an information providing device, an information providing method, an information providing processing program, and a recording medium having the information providing processing program recorded thereon which can efficiently search for image data including object information matching a user's preference, and efficiently recommend information related to a shooting spot matching a user's preference.

Means for Solving the Problem

In order to solve the above problem, the invention according to claim 1 is an information providing device that a terminal device can access through a network, the information providing device comprising:

a receiving means that receives arrangement information indicating an arrangement of object information in a frame, from the terminal device through the network; and a searching means that compares arrangement information indicating an arrangement of object information included in image data in an image data memory means that stores the image data and the arrangement information indicating the arrangement of the object information included in the image data, with the arrangement information received by the receiving means, and searches for image data based on a result of the comparison.

According to the present invention, by having a user specify object information and an arrangement of the object information according to a user's preference, it is possible to efficiently search for image data including the object information matching the user's preference. Further, it is possible to efficiently recommend information related to a shooting spot at which the object information can be captured according to the arrangement of the object information, to the user.

The invention according to claim 2 is the information providing device according to claim 1, further comprising a display control means that displays an object candidate representing the object information arranged in the frame on a display screen of the terminal device such that the user can select the object candidate, wherein the receiving means receives arrangement information which indicates an arrangement of the object candidate which is selected by the user and which is allocated in the frame, as the arrangement information indicating the arrangement of the object information in the frame.

According to the present invention, the user can easily specify object information and an arrangement of the object information according to the user's preference.

The invention according to claim 3 is the information providing device according to claim 1 or 2, wherein the receiving means further receives specific area information indicating a specific area in the frame; and the searching means compares an arrangement of the object information in the specific area indicated by the received specific area information, with an arrangement of object information included in an area corresponding to the specific area in the image data.

According to the present invention, it is possible to provide position information matching image data which the arrangement position of object information matches in a specific area in a frame.

The invention according to claim 4 is the information providing device according to any one of claims 1 to 3, wherein the receiving means further receives color information indicating a color of the object information in the frame; and the searching means further compares a color of the object indicated by the received color information, with a color of the object information included in the image data.

According to the present invention, by having the user further specify a color of object information, it is possible to efficiently search for image data including the object information having the color and matching the user's preference according to the arrangement. Further, it is possible to efficiently recommend information related to a shooting spot at which the object information having the color can be captured according to the arrangement, to the user.

The invention according to claim 5 is the information providing device according to any one of claims 1 to 4, wherein the image data memory means stores position information of the image data;

the receiving means further receives condition information indicating a condition related to the position information; and the searching means performs the comparison of the image data matching position information which satisfies the condition indicated by the received condition information.

According to the present invention, by having the user further specify conditions related to position information, it is possible to narrow down and search for image data meeting the conditions specified by the user. Further, it is possible to narrow down information related to a shooting spot at which the object information can be captured according to the arrangement, to information meeting the conditions specified by the user, and recommend the information.

The invention according to claim 6 is the information providing device according to any one of claims 1 to 5, further comprising a transmitting means that transmits the image data searched by the searching means, to the terminal device.

According to the present invention, it is possible to efficiently provide a user with an image data in which object information matching the user's preference is included.

The invention according to claim 7 is the information providing device according to any one of claims 1 to 4, wherein the image data memory means stores position information of the image data; and the information providing device further comprises a transmitting means that transmits the position information of the image data searched by the searching means, to the terminal device.

According to the present invention, it is possible to efficiently provide a user with the position information of an image data in which object information matching the user's preference is included.

The invention according to claim 8 is the information providing device according to claim 5, further comprising a transmitting means that transmits the position information of the image data searched by the searching means, to the terminal device.

The invention according to claim 9 is an information providing method executed by a computer comprising:

a step of receiving arrangement information indicating an arrangement of object information in a frame, from the terminal device through the network; and a step of comparing arrangement information indicating an arrangement of object information included in image data in an image data memory means that stores the image data and the arrangement information indicating the arrangement of the object information included in the image data, with the received arrangement information, and searching for image data based on a result of the comparison.

The invention according to claim 10 is an information providing processing program causing a computer to function as:

a receiving means that receives arrangement information indicating an arrangement of object information in a frame, from the terminal device through the network; and a searching means that compares arrangement information indicating an arrangement of object information included in image data in an image data memory means that stores the image data and the arrangement information indicating the arrangement of the object information included in the image data, with the received arrangement information, and searches for image data based on a result of the comparison.

The invention according to claim 11 is a recording medium having an information providing processing program recorded thereon that causes a computer to function as:

a receiving means that receives arrangement information indicating an arrangement of object information in a frame, from the terminal device through the network; and a searching means that compares arrangement information indicating an arrangement of object information included in image data in an image data memory means that stores the image data and the arrangement information indicating the arrangement of the object information included in the image data, with the received arrangement information, and searches for image data based on a result of the comparison.

The invention according to claim 12 is an information providing processing program causing a computer to execute:

a step of acquiring arrangement information indicating an arrangement of object information in a frame according to a user's operation; and a step of comparing arrangement information indicating an arrangement of object information included in image data in an image data memory means that stores the image data and the arrangement information indicating the arrangement of the object information included in the image data, with the acquired arrangement information, and searching for image data based on a result of the comparison.

The invention according to claim 13 is a recording medium having an information providing processing program recorded thereon that causes a computer to execute:

a step of acquiring arrangement information indicating an arrangement of object information in a frame according to a user's operation; and a step of comparing arrangement information indicating an arrangement of object information included in image data in an image data memory means that stores the image data and the arrangement information indicating the arrangement of the object information included in the image data, with the acquired arrangement information, and searching for image data based on a result of the comparison.

Advantageous Effects of Invention

According to the present invention, by having a user specify object information and an arrangement of the object information according to a user's preference, it is possible to efficiently recommend information related to a shooting spot at which the object information can be captured according to the arrangement.

BRIEF DESCRIPTION OF DRAWINGS

FIG. 2 is a block diagram illustrating a schematic configuration example of an information providing server 2.

FIG. 3A and FIG. 3B are views illustrating configuration examples of information registered in each database.

FIG. 4A and FIG. 4B are views for explaining position information of object information included in image data.

MODE FOR CARRYING OUT THE INVENTION

An embodiment of the present invention will be described in detail below with reference to the drawings. In addition, the embodiment where the present invention is applied to an information providing system will be described below.

[1. Outline of Configuration and Function of Information Providing System]

Figure 1:
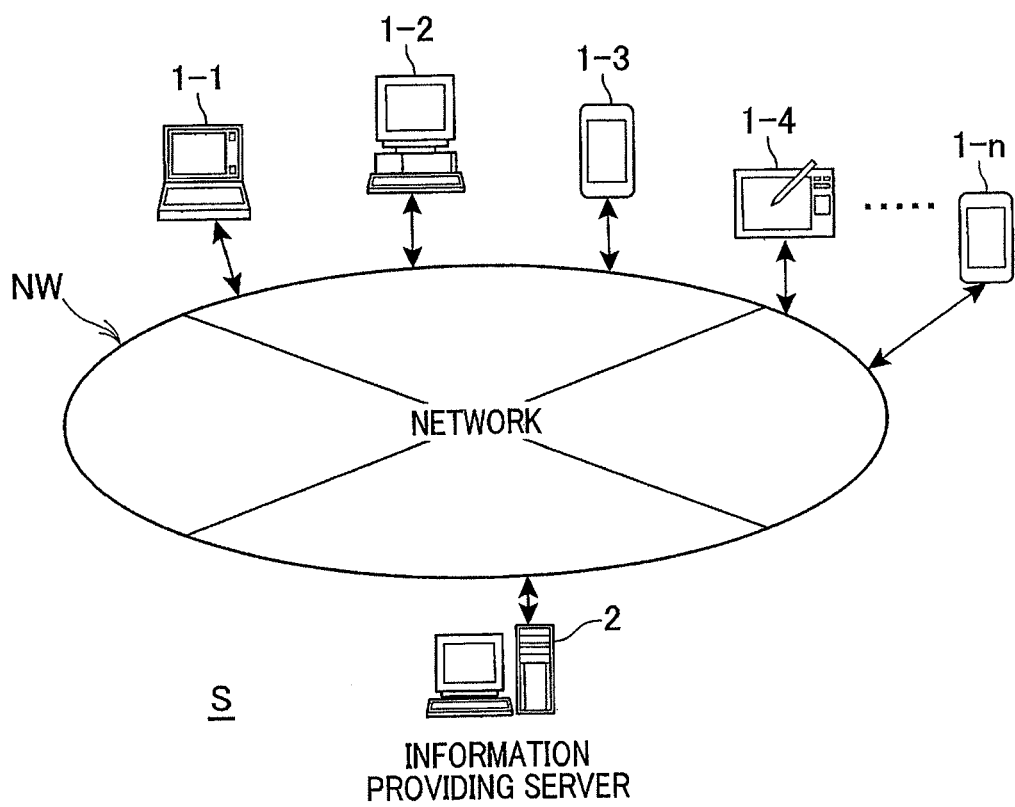
FIG. 1 is a view illustrating an example of a schematic configuration of an information providing system S according to the present embodiment.

First, an outline of a configuration and a function of an information providing system S according to the present embodiment will be described using FIG. 1. FIG. 1 is a view illustrating an example of a schematic configuration of the information providing system S according to the present embodiment.

As illustrated in FIG. 1, the information providing system S has a plurality of terminal devices 1-k (k=1, 2, 3 ... and n) (an example of a terminal device), and an information providing server 2 (an example of an information providing device). The terminal devices 1-k and the information providing server 2 can transmit and receive data to and from each other by, for example, using TCP/IP for a communication protocol through a network NW. In addition, the network NW is formed with, for example, Internet, a dedicated communication line (for example, CATV (Community Antenna Television) line), a mobile communication network (including, for example, base stations) and a gateway.

Next, the information providing server 2 includes one or a plurality of server computers having functions of, for example, a web server, an application server and a database server. The information providing server 2 provides shooting spot providing locations. A shooting spot providing location refers to a location which provides information (shooting location information) related to a spot at which, for example, a landscape which a member wants to capture can be captured according to a member's request.

FIG. 2 is a block diagram illustrating a schematic configuration example of the information providing server 2. As illustrated in FIG. 2, the information providing server 2 roughly has a communication unit 21, a memory unit 22 and a system control unit 23. The communication unit 21 connects to the network NW, and controls a communication state with, for example, the terminal device 1-k. The memory unit 22 has, for example, a hard disk drive, and stores an OS (Operating System), server programs (for example, an information providing processing program according to the present invention) and various items of data. In addition, the information providing processing program according to the present invention may be acquired (downloaded) from, for example, a predetermined server through the network NW, and recorded in a recording medium such as a CD (Compact Disc) or a DVD (Digital Versatile Disc) and read. Further, in the memory unit 22, a user information database (DB) 221 and an image information database (DB) 222 are constructed.

The image information DB 22 of the memory unit 22 is an example of an image data memory means according to the present invention.

FIG. 3 is a view illustrating a configuration example of information registered in each database. In the user information DB 221 illustrated in FIG. 3A, user information such as a user ID of a user registered as a member in a shooting spot providing location, a password, a nickname, a name, a sex, an address, a telephone number and an electronic mail address is associated per user and registered (stored). In addition, a member is registered through a member registration procedure screen provided when, for example, the terminal device 1-k accesses the shooting spot providing location, and then a user ID is issued.

In the image information DB 222 illustrated in FIG. 3B, for example, image data (including a filename), a shooting date of the image data, shooting location information of the image data (shooting location information indicating the shooting spot of the image data. An example of "position information" according to the present invention), and object information included in the image data, arrangement position information of each object information in the image data, and an image ID for identifying the image data are associated per use, and registered. In addition, when a plurality of pieces of object information are included in image data, object information and arrangement position information of the object information are registered. Although FIG. 3B illustrates an example where only one object information is included in a picture, when a plurality of pieces of object information are included, "object information" and "arrangement position information of object information" the numbers of pieces of which correspond to object information are registered.

Image data registered in the image information DB 222 only needs to be image data which enables at least shooting location information to be specified. For example, (i) to register image data posted to an image posting location separately run by the information providing server 2, shooting location information needs to be transmitted by a poster together with image data, and is registered. Further, (ii) to register image data acquired on a webpage by a so-called crawler, only image data which enables shooting location information to be specified from a webpage is registered. Meanwhile, shooting location information is, for example, longitude/latitude information or address information. In addition, in case of (i), as long as image data is captured by a camera having a GPS function, shooting location information is also recorded, and therefore shooting location information needs to be transmitted. Further, when image data is captured by a camera without a GPS function, shooting location information needs to be specified by a poster. For example, the shooting location information may be specified on a map displayed on the image data posting screen or may be selected stepwise from an address list displayed hierarchically. Further, when image data is registered, image data from which a shooting date can be acquired is preferably registered in the image information DB 222 in addition to shooting location information.

Object information registered in the image information DB 222 is, for example, information indicating a subject in a picture of the image data. The object information includes, for example, people, animals (deers, monkeys, bears, birds, etc.), plants (flowers, high-altitude plants, etc.), landscapes (buildings, bridges, mountains, lakes, rivers, the sea, hot springs, big trees, forests, waterfalls, autumnal leaves, a sunrise and a sunset), and insects. Such object information is represented by a picture of image data registered in the image information DB 222. By, for example, extracting a feature amount such as gradient information and edge information from image data and comparing it with a plurality of items of correct data prepared in advance (the feature amount of object information which serves as a criterion), the system control unit 23 can recognize object information. According to such an object recognition algorithm, it is possible to identify the type, the position, the number of pieces, the size and the color of object information represented by a picture of image data. By this means, it is possible to acquire object information such as "a plurality of people", "two mountains", "a lake", "a sunset and high-altitude plants" and "a deer and a forest", from image data. In addition, a configuration may be employed where, when unknown object information which cannot be specified upon comparison with all items of correct data (known data) prepared in advance is extracted, this new object information is registered as correct data. In this case, object information which is newly registered as correct data is set by being set by an administrator at random, or by extracting a feature word from text information (for example, a title or a tag assigned to an image) matching unknown object information. Further, a configuration may be employed where, when object information cannot be specified upon comparison with all items of correct data prepared in advance, a user who posts image data arbitrarily assigns object information to the image data. In this case, for example, image data and object information assigned to the image data are transmitted from the terminal device 1-$k$ of the user to the information providing server 2, and registered in the image information DB 222. Further, for example, a configuration may be employed where the information providing server 2 transmits data of an object information specifying screen for inputting or selecting object information, to the terminal device 1-$k$ of the user. In this case, object information input by the user or selected by the user from a user object information candidate list through the operation unit on the user object information specifying screen displayed on the display unit of the terminal device 1-$k$ is transmitted to the information providing server 2, and is registered in the image information DB 222 in association with the image data.

Figures 4A, 4B:
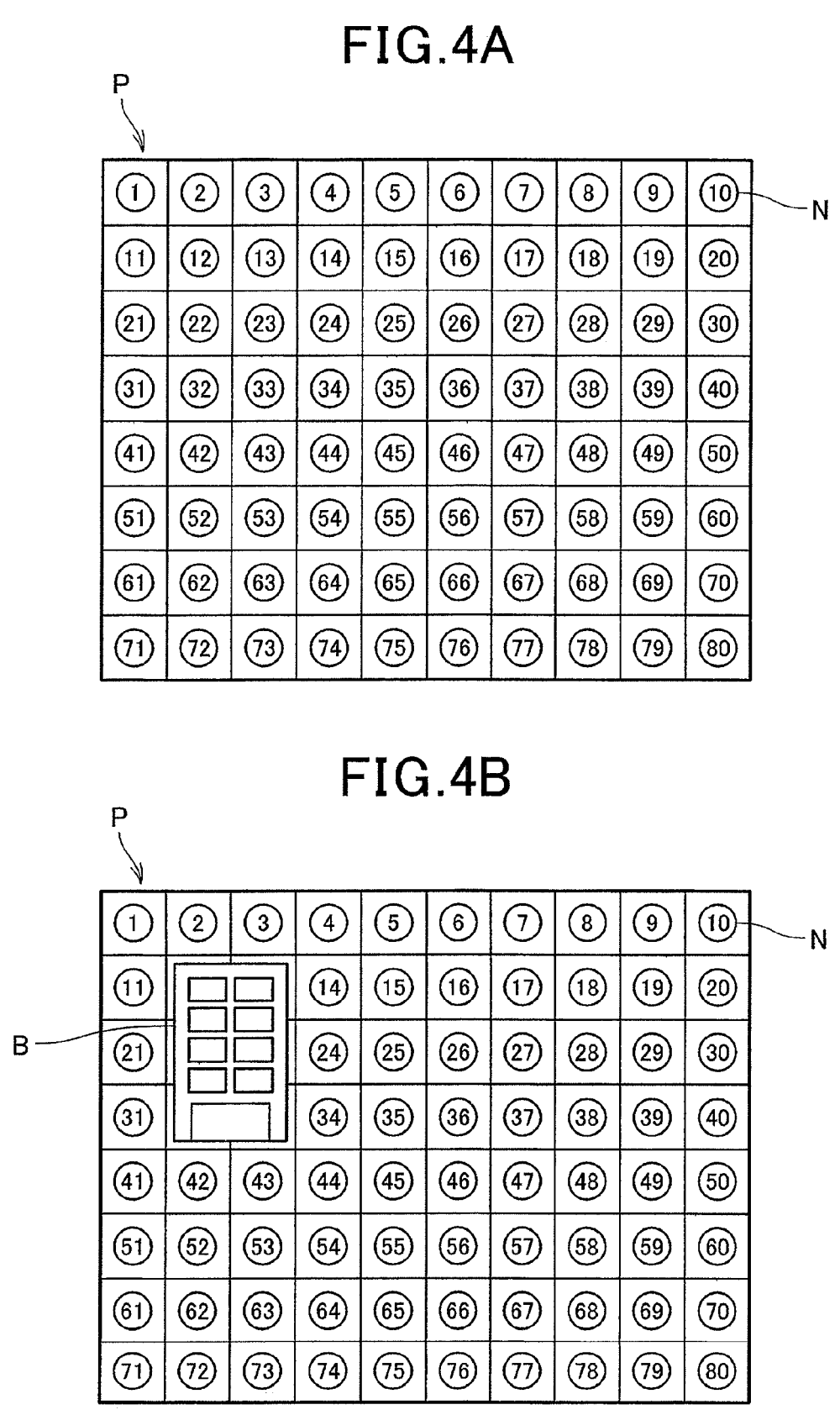

As arrangement position information of object information to be registered in the image information DB 222, an area number N allocated to each area obtained by dividing an image P as illustrated in FIG. 4A is registered. For example, when a building (hereinafter, abbreviated as "bldg") B is represented in areas of "12", "13", "22", "23", "32" and "33" as illustrated in FIG. 4B, these area numbers are registered as arrangement position information of object information "bldg". In addition, an area number to be registered is an area number matching an area a predetermined rate (for example 60%) or more of which is occupied by object information. Further, although the image P is divided into 80 areas with an example in FIG. 4, the size and the shape of object information may be specified in more detail by further dividing an image.

In addition, the object recognition algorithm can adopt a technique such as known SIFT (Scale Invariant Feature Transform) can be used, and therefore will not be described in more detail. Further, although object information cannot be recognized depending on image data in some cases (there is no corresponding correct data or an image is complicated), a configuration may be employed in this case where, when image data posted by a poster is registered, object information included in image data and arrangement position information of the object information are input by the poster and registered.

The system control unit 23 has, for example, a CPU (Central Processing Unit) 23$a$, a ROM (Read Only Memory) 23$b$ and a RAM (Random Access Memory) 23$c$. Further, when the CPU 23$a$ reads and executes a server program stored in the ROM 23$b$ or the memory unit 22, the system control unit 23 functions as, for example, a receiving means, a searching means, a transmitting means and a display control means according to the present invention, and performs processing which is described below.

Meanwhile, although not illustrated, the terminal device 1-$k$ has, for example, a control unit which has, for example, a CPU, a RAM and a ROM as a computer, a memory unit which has, for example, a flash memory, a communication unit which communicates with, for example, the information providing server 2, an operation unit which is operated by a user and a display unit which displays various screens (for example, webpages) provided from the information providing server 2. In addition, the terminal devices 1-$k$ are, for example, PCs (Personal Computers), mobile telephones, PDAs and mobile game machines.

The control unit of the terminal device 1-$k$ accesses a shooting spot providing location, and controls log-in processing. Further, when the user is authenticated in log-processing, display data for displaying an object information arrangement screen is received from the information providing server 2, and the object information arrangement screen is displayed on the display unit.

Figure 5:
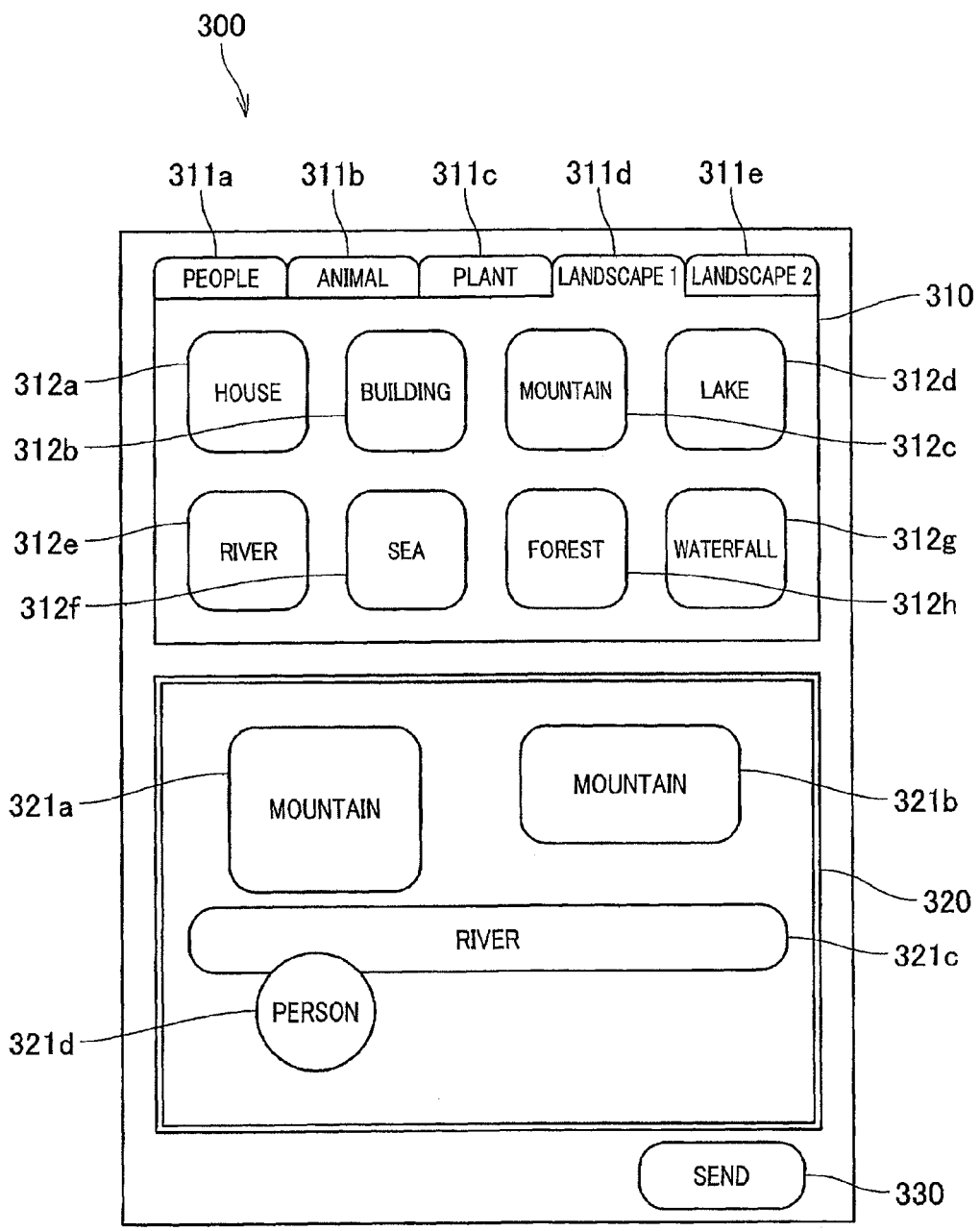
FIG. 5 is a view illustrating an example of an object information arrangement screen.

FIG. 5 is a view illustrating an example of an object information arrangement screen. An object information arrangement screen 300 displays an object candidate display unit 310 which displays a list of object information, a pseudo frame 320 (an example of "frame" according to the present invention) and a send button 330. The object candidate display unit 310 displays object candidates 312 (312$a$ to 312$h$) matching a tab 311 selected by a user among tabs 311 (311$a$ to 311$e$) provided per genre of object information. The object candidates 312 can be moved and arranged in the pseudo frame 320 by a predetermined arranging operation (for example, drag and drop) by the user. Further, the size and the shape of the object information 321 (321$a$ to 321$d$) arranged in the pseudo frame 320 can be changed by a user's predetermined operation. The user can arrange a plurality of object candidates 321 in the pseudo frame 320 by repeating a predetermined arranging operation.

When the send button 330 is pushed by the user in a state where the object information 321 is arranged in the pseudo frame 320, the control unit of the terminal device 1-$k$ transmits a request message (information acquisition request) including user arrangement information (an example of "arrangement information indicating an arrangement of object information in a frame" according to the present invention), to the information providing server 2. The user arrangement information is information for specifying an arrangement position of the object information 321 in the pseudo frame 320 on the information providing server 2. With the present embodiment, information which associates the object information 321 and an area number allocated to each area obtained by dividing the pseudo frame 320 per object information 321 arranged by a user is transmitted as user arrangement information. In addition, an area number allocated to each area obtained by dividing the pseudo frame 320 is the same as the area number N allocated to each area obtained by dividing the image P described using FIG. 4, and therefore will not be described.

In addition, although FIG. 5 illustrates a difference between types of the object candidates 312 (object information 321) by way of letters (for example, "house" or "bldg"), the difference may be represented by a picture (for example, a picture representing a mountain or a waterfall) image or a combination of letters and a picture image.

[2. Processing of Recommending Shooting Location Information in Information Providing System]

Next, processing of recommending shooting location information in the information providing server 2 will be described using FIG. 6.

Figure 6:
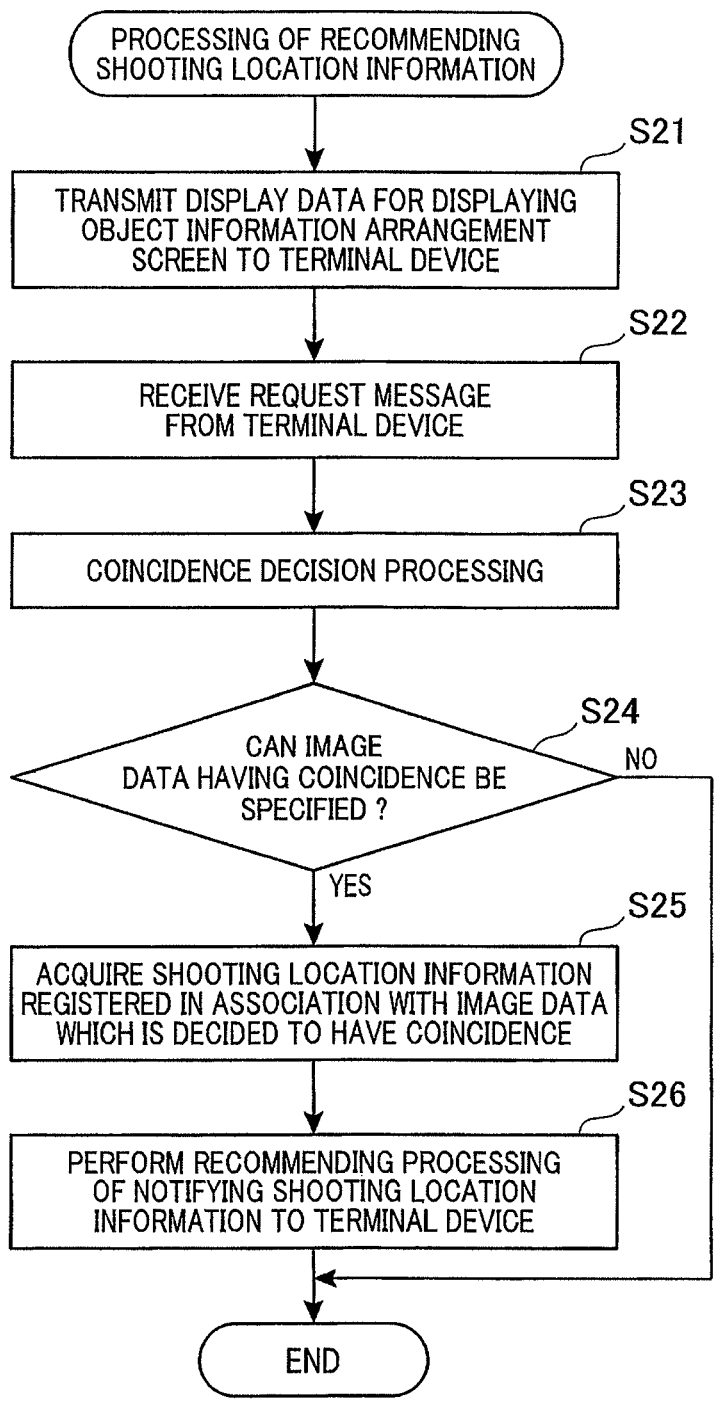
FIG. 6 is a flowchart illustrating processing of recommending location information in the system control unit 23 of the information providing server 2.

FIG. 6 is a flowchart illustrating processing of recommending shooting location information in the system control unit 23 of the information providing server 2. In addition, the processing illustrated in FIG. 6 is started when the terminal device 1-$k$ accesses, for example, a shooting spot providing location and the user is authenticated in log-in processing.

In FIG. 6, the system control unit 23 of the information providing server 2 transmits display data for displaying the object information arrangement screen 300, to the terminal device 1-$k$ (step S21). The terminal device 1-$k$ which receives this display data displays the object information arrangement screen 300 on the display unit of the terminal device 1-$k$. Further, as described above, when the send button 330 is pushed by the user in the state where the object information 321 is arranged in the pseudo frame 320, the terminal device 1-$k$ transmits a request message including user arrangement information to the information providing server 2.

When receiving the request message from the terminal device 1-$k$ (step S22), the system control unit 23 of the information providing server 2 performs coincidence decision processing (step S23). More specifically, by comparing user arrangement information included in the received request message, and object information and arrangement position information of the object information registered in the image information DB 222, the system control unit 23 decides the coincidence, and searches for image data based on a decision result of the coincidence (that is, searches for image data based on the comparison result). When, for example, all pieces of the object information 321 arranged in the pseudo frame 320 by the user match, and all area numbers of these pieces of the object information 321 match, it is decided that there is the coincidence. In addition, when at least part of pieces of the object information 321 arranged in the pseudo frame 320 by the user match, and the area numbers of these pieces of object information match, it may be decided that there is the coincidence. Alternatively, when all or at least part of pieces of the object information 321 arranged in the pseudo frame 320 by the user match, and the area numbers of these pieces of the object information match at a predetermined rate (for example, 70%) or more, it may be decided that there is the coincidence. By this means, it is possible to efficiently search for image data including object information matching a user's preference.

When it is not possible to specify image data having the coincidence upon the search (step S24: NO), the system control unit 23 finishes the processing illustrated in FIG. 6. Meanwhile, when it is possible to specify image data having the coincidence upon the search (step S24: YES), the system control unit 23 proceeds to step S25.

In step S25, the system control unit 23 acquires at least one of image data specified based on the decision result of the coincidence and shooting location information registered in association with the image data (shooting location information indicating a shooting spot of the image data), from the image information DB 222.

Further, the system control unit 23 executes recommending processing of transmitting at least one of the acquired image data and shooting location information, to the terminal device 1-$k$ (step S26). At least one of the image data and the shooting location information transmitted in this way are displayed on the screen of the display unit of the terminal device 1-$k$, and then is notified to the user. Thus, information related to a shooting spot (image data and shooting location information indicating a shooting spot of the image data) is recommended for the user.

In addition, a configuration may be employed where, in the recommending processing, at least one of the image data and the shooting location information are described in an electronic mail, and the electronic mail is transmitted to an electronic mail address of the user.

As described above, according to the embodiment, the information providing server 2 compares object information included in image data registered in the image information DB 222 and an arrangement position of the object information, and object information specified in the pseudo frame 320 by the user of the terminal device 1-$k$ and an arrangement position of the object information, and searches for image data based on the comparison result, so that it is possible to efficiently search for image data including the object information matching a user's preference. Further, the information providing server 2 notifies at least one of the searched image data and shooting location information of the image data, to the user of the terminal device 1-$k$. By this means, by having the user of the terminal device 1-$k$ specify object information and arrangement positions of the object information according to a user's preference, it is possible to efficiently recommend information related to a shooting spot at which the object information can be captured at the arrangement position.

Further, with the information providing server 2, the system control unit 23 transmits display data for the object information arrangement screen 300 for displaying the object candidates 312 to be arranged in the pseudo frame 320, on the display screen of the terminal device 1-$k$ such that the user can select the object candidate 312, and receives user arrangement information indicating the object candidate 312 selected by the user and the arrangement position of the object 312 assigned in the pseudo frame 320 on the display screen. By this means, the user can easily specify object information and the arrangement position of the object information according to a user's preference.

In addition, a configuration may be employed where, upon decision of the coincidence in step S23, position information indicating a current position of an authenticated user (for example, position information detected by the GPS receiver of the terminal device 1-$k$), or position information indicating a position specified by the user is acquired from the terminal device 1-$k$. In this case, the system control unit 23 searches for image data captured within a predetermined range (for example, a range within a predetermined distance of the radius about the current position of the user or the position specified by the user) from a position (for example, the current position of the user or the position specified by the user) indicated by position information acquired from the terminal device 1-$k$ among each image data registered in the image information DB 222. By this means, it is possible to efficiently search for image data including object information matching a user's preference near a location where the user is currently is (for example, a trip destination) or a location specified by the user, and efficiently recommend information related to a shooting spot at which object information matching a user's preference can be captured at an arrangement position matching a user's preference.

Further, a configuration may be employed where, when there are a plurality of items of image data specified based on the decision result of the coincidence (that is, the comparison result) in processing in step S24, a list of shooting location information registered in association with each image data is transmitted to the terminal device 1-*k* and displayed in the recommending processing in step S26. According to this configuration, even when there are multiple locations which are recommendation targets, the user can easily learn a shooting spot near these locations.

Further, when there are a plurality of items of image data specified based on the decision result of the coincidence in the processing in step S24, map information indicating the position of each shooting location registered in association with each image data may be transmitted to the terminal device 1-*k* and displayed in the recommendation processing in step S26. According to this configuration, even when there are multiple locations which are recommendation targets, the user can easily learn from a map a position of a shooting spot near these locations.

Further, in processing in step S24, when image data cannot be specified based on a decision result of the coincidence, decision conditions may be gradually loosened until at least one image data can be specified based on the decision result of the coincidence. More specifically, the number of pieces of object information to be compared may be gradually decreased. Further, when a position at which object information is arranged by the user and an arrangement position at which corresponding object information is represented in image data are compared, a range in which the coincidence is decided may be gradually expanded. When, for example, the position at which object information is arranged by the user is indicated by area numbers "12", "13", "22" and "23", areas to be compared may be expanded such that it is decided that image data including corresponding object information represented in some areas indicated by area numbers "1" to "5", "11" to "15", "21" to "25" and "31" to "35" has coincidence. By this means, it is possible to reduce the likelihood of occurrence of an accident that it is not possible to respond to a user's request.

Further, although all areas in the pseudo frame 320 and all areas of image data are compared in processing in step S23 (coincidence decision processing), a specific area (for example, left half area) in the pseudo frame 320 and a specific area (for example, left half area) in image data may be compared by, for example, allowing the user to specify part of an area in the pseudo frame 320 as the specific area through the object information arrangement screen 300. More specifically, the system control unit 23 further receives specific area information indicating the specific area in the pseudo frame 320, from the terminal device 1-*k*, and decides the coincidence between an arrangement position of object information in the specific area indicated by the received specific area information, and an arrangement position of object information included in an area corresponding to the specific area in the registered image data. By so doing, it is possible to efficiently search for image data including object information matching a user's preference in at least a specific area, and recommend information related to a shooting spot at which object information matching a user's preference in at least the specific area can be captured at an arrangement position matching a user's preference. That is, although any object information may be arranged at any position in a right half area which is not specified by the user as a specific area, this is suitable for the user who wants to capture an image in which desired object information is arranged at a desired position in the left half area specified at least by the user as the specific area. In addition, preferably, the location, the size, the shape and the number of the specific area can be specified by the user.

Further, although only arrangement positions of object information are compared in processing in step S23 (coincidence decision processing), arrangement positions and colors of object information may be compared by, for example, allowing the user to specify the color of object information arranged in the pseudo frame 320 through the object information arrangement screen 300. More specifically, the system control unit 23 further receives color information indicating the color of the object information in the pseudo frame 320, and further decides the coincidence between the color of the object indicated by the received color information, and a color of object information included in registered image data. By so doing, the user can efficiently search for image data including a mountain in which trees have autumnal leaves by, for example, specifying "mountain" as object information and specifying "red" or "yellow" as the color of "mountain", and acquire information related to a shooting spot from which a mountain having autumnal leaves can be captured. In addition, by transmitting shooting location information and a shooting date, it is possible to present a suitable season for shooting, to the user.

Further, although all items of image data registered in the image information DB 222 are comparison targets in processing in step S23 (coincidence decision processing), the user may specify conditions related to shooting location information to use only image data matching shooting location information satisfying the conditions as comparison targets. More specifically, the system control unit 23 further receives condition information indicating the conditions related to shooting location information, and performs processing in step S23 (coincidence decision processing) with respect to image data matching the shooting location information satisfying the conditions indicated by the received condition information. By so doing, the user can efficiently search for image data which can be captured in the Kanto area by, for example, specifying that "a shooting location is in a Kanto area" as the conditions related to shooting location information, and acquire information related to a spot in the Kanto area. Further, when the user has a plan to make a trip to Korea, the user can efficiently search for image data which can be captured in Korea by specifying that "a shooting location is in Korea" as the conditions related to shooting location information, and acquire information related to a spot in Korea. Furthermore, the user can efficiently search for image data including a desired scenery by specifying that "a shooting location is a room of an accommodation facility" as the conditions related to shooting location information and arranging object information through the object information arrangement screen 300 according to a scenery which the user wants to see from a room, and acquire information related to a spot related to the room of the accommodation facility from which the user can see a desired scenery. In addition, an accommodation facility guiding system may be separately constructed to provide information related to a spot and guide information for a corresponding accommodation facility. Further, a reservation service for an accommodation facility may be provided.

Furthermore, a configuration may be employed where an extraction target range of image data may be determined based on specified object information of a shooting target specified by the user in processing in step S23 (coincidence decision processing). When, for example, the user specifies "mountain" as object information and specifies "Mt. Fuji" to specify the mountain (specified from position information), a predetermined range based on position information of specified Mt. Fuji (for example, the longitude and the latitude) is determined as an extraction target range of image data, and image data captured within the range is searched for in processing in step S23 (coincidence decision processing). By this means, it is possible to search for image data including object information (for example, Mt. Fuji) matching a user's preference around object information (for example, Mt. Fuji) of the specified shooting target specified by the user, and efficiently recommend information related to a shooting spot at which object information (for example, Mt. Fuji) matching a user's preference can be captured at an arrangement position matching a user's preference. In addition, the predetermined range based on position information of Mt. Fuji corresponds to, for example, a range within a predetermined distance of the radius (for example, 10 km) about the longitude and the latitude of Mt. Fuji. Further, the extraction target range may be, for example, a donut-shaped concentric circle (that is, a donut area outside a circle about the position information) based on the position information of Mt. Fuji. Furthermore, a configuration may be employed where the predetermined distance of the radius may be, for example, increased stepwise based on the position information of Mt. Fuji to expand the extraction target range stepwise. Also in this case, for example, the donut-shaped concentric circle based on the position information of Mt. Fuji may be expanded stepwise, and the circle (that is, a circle inside the donut area) about the position information may be expanded stepwise in association with the expansion. Alternatively, a configuration may be employed where the predetermined range is, for example, determined based on a rate of a size (for example, a ratio of an area) of the object information 321 (mountain) arranged in the pseudo frame 320 illustrated in FIG. 5 with respect to the pseudo frame 320. When, for example, the rate of the size of the object information 321 (mountain) with respect to the pseudo frame 320 is 90%, the range within 5 km of the radius about the longitude and the latitude of the mountain is determined as the extraction target range. Further, when the rate becomes closer to 0% from 80% (in other words, the size of the object information 321 becomes smaller), the radius gradually becomes larger, and, as a result, the extraction target range is determined such that the extraction target range gradually expands. According to the configuration, the user can simply determine an extraction target range of image data only by determining the size of the object information 321. In addition, for example, "Mt. Fuji" is specified for specifying the mountain as conditions related to shooting location information. In this case, the system control unit 23 receives condition information including specified "Mt Fuji" as the conditions from the terminal device 1-k together with user arrangement information.

A configuration is employed with the present embodiment where, (i) to register image data posted to an image posting location in the image information DB 222, the system control unit 23 of the information providing server 2 specifies object information included in the received image data and arrangement position information of the object information using an object recognition algorithm. A configuration may be employed instead of this configuration where a program including an object recognition algorithm is installed in a terminal device of a poster, object information included in image data and arrangement position information of the object information are specified by the terminal device, and the object information and the arrangement position information are received by the information providing server 2. Further, an information providing processing program including the object recognition algorithm is installed in the terminal device, and image data, object information included in the image data and arrangement position information of each object information in the image data are stored in, for example, an internal memory unit mounted in the terminal device or an external memory unit connected to the terminal device. Furthermore, a configuration may be employed where the terminal device acquires user arrangement information indicating an arrangement of object information in a frame according to a user's operation as described using FIG. 5, compares the arrangement position information of the object information included in the image data stored in the memory unit and the acquired user arrangement information, and searches for and displays image data based on the comparison decision result. By this means, for example, it is possible to efficiently search for image data including object information matching a user's preference from multiple items of image data collected by the user, and present the image data to the user. In addition, the information providing processing program to be installed in the terminal device may be acquired (downloaded) from, for example, a predetermined server through the network NW, and recorded in a recording medium such as a CD (Compact Disc) or a DVD (Digital Versatile Disc) and read.

Further, although an arrangement position and the size of object information in the image P or the pseudo frame 320 are managed according to an area number with the present embodiment, the arrangement position and the size may be managed according to an outline coordinate of object information in the image P or the pseudo frame 320. In this case, the coincidence is decided by comparing outline coordinates of object information. When, for example, the picture P and the pseudo frame 320 are superimposed, if an overlapping portion of the object information is a predetermined rate or more, it is decided that there is the coincidence. In addition, an arbitrary method can be used for a method of managing an arrangement position and the size of object information.

Further, although image data of a search target is a shooting target at a shooting spot with the embodiment, image data may be image data irrelevant to a shooting spot.

REFERENCE SIGNS LIST 1-k TERMINAL DEVICE
2 INFORMATION PROVIDING SERVER
21 COMMUNICATION UNIT
22 MEMORY UNIT
23 SYSTEM CONTROL UNIT
NW NETWORK
S INFORMATION PROVIDING SYSTEM

The invention claimed is:

1. An information providing device that a terminal device can access through a network, the information providing device comprising:
   a receiving means that receives arrangement information indicating a type of a subject and an arrangement of the subject in a frame, from the terminal device through the network; and
   a searching means that compares the arrangement information stored in an image data memory means that stores the image data and the arrangement information indicating the type of the subject and the arrangement of the subject included in the image data, with the arrangement information received by the receiving means, and searches for image data based on a result of the comparison,
   wherein the type of the subject describes a group to which the subject belongs, the group including objects that share a set of features.

2. The information providing device according to claim 1, further comprising a display control means that displays a candidate representing the subject arranged in the frame on a display screen of the terminal device such that the user can select the candidate, wherein the receiving means receives arrangement information which indicates a type of the candidate and an arrangement of the candidate which are selected by the user and which are allocated in the frame, as the arrangement information indicating the type of the subject and the arrangement of the subject in the frame.

3. The information providing device according to claim 2, wherein the receiving means further receives specific area information indicating a specific area in the frame; and the searching means compares the type of the subject and the arrangement of the subject in the specific area indicated by the received specific area information, with the type of the subject and the arrangement of the subject included in an area corresponding to the specific area in the image data.

4. The information providing device according to claim 2, wherein the receiving means further receives color information indicating a color of the subject information in the frame; and the searching means further compares a color of the subject indicated by the received color information, with a color of the subject included in the image data.

5. The information providing device according to claim 2, wherein the image data memory means stores position information of the image data;

the receiving means further receives condition information indicating a condition related to the position information; and the searching means performs the comparison of the image data matching position information which satisfies the condition indicated by the received condition information.

6. The information providing device according to claim 2, further comprising a transmitting means that transmits the image data searched by the searching means, to the terminal device.

7. The information providing device according to claim 2, wherein the image data memory means stores position information of the image data; and the information providing device further comprises a transmitting means that transmits the position information of the image data searched by the searching means, to the terminal device.

8. The information providing device according to claim 1, wherein the receiving means further receives specific area information indicating a specific area in the frame; and the searching means compares the type of the subject and the arrangement of the subject in the specific area indicated by the received specific area information, with the type of the subject and the arrangement of the subject included in an area corresponding to the specific area in the image data.

9. The information providing device according to claim 1, wherein the receiving means further receives color information indicating a color of the subject in the frame; and the searching means further compares a color of the subject indicated by the received color information, with a color of the subject included in the image data.

10. The information providing device according to claim 9, further comprising a transmitting means that transmits the position information of the image data searched by the searching means, to the terminal device.

11. The information providing device according to claim 1, wherein the image data memory means stores position information of the image data;

the receiving means further receives condition information indicating a condition related to the position information; and the searching means performs the comparison of the image data matching position information which satisfies the condition indicated by the received condition information.

12. The information providing device according to claim 1, further comprising a transmitting means that transmits the image data searched by the searching means, to the terminal device.

13. The information providing device according to claim 1, wherein the image data memory means stores position information of the image data; and the information providing device further comprises a transmitting means that transmits the position information of the image data searched by the searching means, to the terminal device.

14. An information providing method executed by a computer comprising:

acquiring arrangement information indicating a type of a subject and an arrangement of the subject in a frame according to a user's operation; and comparing arrangement information included in image data stored in an image data memory means that stores the image data and the arrangement information indicating the type of the subject and the arrangement of the subject included in the image data, with the acquired arrangement information, and searching for image data based on a result of the comparison, wherein the type of the subject describes a group to which the subject belongs, the group including objects that share a set of features.

15. An information providing device that a terminal device can access through a network, the information providing device comprising:

a controller comprising a processor and a memory, the controller configured to:

a receive arrangement information indicating a type of a subject and an arrangement of the subject in a frame, from the terminal device through the network;

compare the arrangement information stored in an image data memory as the memory that stores the image data and the arrangement information indicating the type of the subject and the arrangement of the subject included in the image data, with the received arrangement information; and search for image data based on a result of the comparison, wherein the type of the subject describes a group to which the subject belongs, the group including objects that share a set of features.

* * * * *